(12) United States Patent
Dotan et al.

(10) Patent No.: US 8,683,592 B1
(45) Date of Patent: Mar. 25, 2014

(54) ASSOCIATING NETWORK AND STORAGE ACTIVITIES FOR FORENSIC ANALYSIS

(75) Inventors: Yedidya Dotan, Tel Aviv (IL); Assaf Natanzon, Tel Aviv (IL); Uri Rivner, Mishmeret (IL)

(73) Assignee: EMC Corporation, Hopkinton, MA (US)

( * ) Notice: Subject to any disclaimer, the term of this patent is extended or adjusted under 35 U.S.C. 154(b) by 89 days.

(21) Appl. No.: 13/341,174

(22) Filed: Dec. 30, 2011

(51) Int. Cl.
*G06F 21/55* (2013.01)
*H04L 29/06* (2006.01)

(52) U.S. Cl.
CPC .......... *G06F 21/552* (2013.01); *H04L 63/1425* (2013.01); *H04L 63/1408* (2013.01)
USPC .......................................... 726/23; 709/224

(58) Field of Classification Search
CPC . H04L 63/14; H04L 63/1416; H04L 63/1425; H04L 63/1433; H04L 63/1491; G06F 21/552; G06F 11/30
USPC .......................................... 709/224; 726/24
See application file for complete search history.

(56) References Cited

U.S. PATENT DOCUMENTS

| | | | |
|---|---|---|---|
| 7,516,287 B2 | 4/2009 | Ahal et al. | |
| 7,577,867 B2 | 8/2009 | Lewin et al. | |
| 7,624,443 B2 * | 11/2009 | Kramer et al. | 726/22 |
| 7,627,612 B2 | 12/2009 | Ahal et al. | |
| 7,627,687 B2 | 12/2009 | Ahal et al. | |
| 7,634,557 B2 | 12/2009 | Moore et al. | |
| 7,774,565 B2 | 8/2010 | Lewin et al. | |
| 8,320,261 B2 * | 11/2012 | Vasamsetti et al. | 370/242 |
| 2002/0069335 A1 * | 6/2002 | Flylnn, Jr. | 711/153 |
| 2006/0137010 A1 * | 6/2006 | Kramer et al. | 726/22 |
| 2008/0098476 A1 * | 4/2008 | Syversen | 726/23 |
| 2009/0067443 A1 | 3/2009 | Moore et al. | |
| 2009/0094296 A1 * | 4/2009 | Scholl et al. | 707/203 |
| 2009/0158430 A1 | 6/2009 | Borders | |
| 2010/0002704 A1 | 1/2010 | Moore et al. | |

(Continued)

FOREIGN PATENT DOCUMENTS

JP 2011053893 A * 3/2011

OTHER PUBLICATIONS

Tierney, B. L. et al. Improving Distributed Application Performance Using TCP Instrumentation, May 3, 2003, report LBNL-52590.*

(Continued)

*Primary Examiner* — Lisa Lewis
*Assistant Examiner* — Zhimei Zhu
(74) *Attorney, Agent, or Firm* — BainwoodHuang

(57) ABSTRACT

An improved technique for performing forensic investigations in an electronic system includes capturing and associating multiple streams of information. The streams include a network stream and a storage stream. The network stream includes a record of network activities. The storage stream includes a record of storage activities. In some examples, the storage stream includes both disk activities and memory activities, including both reads and writes. Records of the captured streams are stored in a data storage array and are associated by applying a common timing reference to the records. A comprehensive history is thus obtained, with both network and storage activities coordinated in time, to enable examination and tracing of suspect or malicious occurrences across network and storage domains. The improved technique can be used in both physical and virtual computing environments and affords particular advantages in virtual and cloud environments where forensic analysis has proven to be difficult.

22 Claims, 6 Drawing Sheets

(56) References Cited

U.S. PATENT DOCUMENTS

| | | |
|---|---|---|
| 2010/0281543 A1 | 11/2010 | Golomb et al. |
| 2011/0321166 A1* | 12/2011 | Capalik et al. ............. 726/25 |
| 2012/0173710 A1* | 7/2012 | Rodriguez ................ 709/224 |
| 2012/0192278 A1* | 7/2012 | Kito et al. ................. 726/24 |
| 2012/0275328 A1* | 11/2012 | Iwata et al. ............... 370/252 |
| 2013/0086337 A1* | 4/2013 | Habeck .................... 711/156 |

OTHER PUBLICATIONS

David Dagon et al., "HoneyStat: LocalWorm Detection Using Honeypots", Recent Advances in Intrusion Detection Lecture Notes in Computer Science vol. 3224, 2004, pp. 39-58.*

* cited by examiner

ASSOCIATING NETWORK AND STORAGE ACTIVITIES FOR FORENSIC ANALYSIS

BACKGROUND

Security specialists often perform forensic investigations on computer systems following malicious attacks. These investigations can reveal evidence, which may be applied to ascertain the scope of the attacks and to assist in developing safeguards to prevent similar attacks from recurring. Forensic investigations can also be performed to gather evidence related to suspect activity involving a computer. In some cases, collected evidence may be applied in law enforcement or in civil actions seeking monetary damages.

Various tools have been developed to assist in forensic investigations. For example, NextGen is a forensic tool available from NetWitness® of Reston, Va., which performs real-time network forensics using full packet capture and session analysis. NextGen also provides a number of analytic tools, which allow users to trace malware propagation over a network.

Also, Continuous Data Protection (CDP) saves backups of all changes to a computer's disk, so that each change is retained. CDP solutions allow users to restore the state of their disk drives to any point in time for which CDP was active. CDP can be used forensically to trace the propagation of malware or data corruption through different files or blocks of a user's machine. It can also be used to restore content containing suspect or illegal materials, which may have been deleted from the user's hard drive but retained in the CDP backup.

SUMMARY

Unfortunately, network forensic tools and CDP are both limited in terms of the scope of computing activities they are able to capture. For example, network forensics may be effective at monitoring network activity; however, threats can sometimes propagate through machines, and even between machines, with little or no suspect network activity occurring. Therefore, network activity, when viewed by itself, may appear normal, even though malicious events are occurring. Similarly, CDP solutions accurately track disk activity; however, not all threats involve disk activity. Whatever disk activity does occur may appear normal. More fundamentally, network forensics and CDP operate in separate domains. One tracks network activities, whereas the other tracks disk activities. Each thus provides only a partial, limited window into the operation of a computing system as a whole.

Also, with advances in online computing, there has been a substantial increased use of "virtual machines," i.e., computing machines implemented as memory constructs independent of the physical computers on which they are run. Virtual machines are commonly run on servers "in the cloud," where they are created, used for some period of time, and destroyed. When a virtual machine is destroyed, one or more new virtual machines may be created in its place, using memory and disk space that had been used by the previous virtual machine. Virtual machine solutions for cloud computing may be obtained, for example, from VMWare® of Palo Alto, Calif.

Although virtual machines offer many advantages over physical machines for certain purposes, they present a particular challenge with regard to data forensics, since their existence is transient, as well as the disk and memory traces they leave behind. Indeed, by the time forensics are applied to a virtual machine, the virtual machine may have long since ceased to exist and the memory and disk used for the virtual machine may have been overwritten multiple times.

Also, prior forensic analysis tools have been designed, developed and deployed for physical, rather than virtual, computing environments. Using such forensic analysis tools in a virtual environment where virtual machines can be created, destroyed, and run in parallel for periods of time on the same set of physical components, all these changes applied either automatically or manually, has proven to be difficult and time consuming.

In contrast with these conventional approaches, which each provide a limited view into a computing system's operation and present particular challenges when used with virtual machines, an improved technique for performing forensic investigations in an electronic system includes capturing and associating multiple streams of information about a computing machine, whether it be a physical machine or a virtual machine. The streams include a network stream and a storage stream. The network stream includes a record of network activities of the computing machine. The storage stream includes a record of storage activities of the computing machine. In some examples, the storage stream includes both disk activities and memory activities, including both reads and writes. Records of the captured streams are stored in a data storage array. Records of network activities and storage activities are associated by applying a common timing reference to the records. A comprehensive history of the machine is thus obtained, with both network and storage activities coordinated in time, to enable examination and tracing of suspect or malicious occurrences across network and storage domains. Activities can be traced from one domain to the other, and activities from both domains can be synthesized to zero in on suspect activities that might otherwise go undetected if only a single domain were inspected. Collecting storage records in the form of separate disk records and memory records provides still further investigatory content, as changes in memory and disk provide distinct views of the machine's state. By providing all three views of a machine, the potential for detecting suspect or malicious activity is multiplied. Also, since all network, memory, and disk activities are stored in the data storage array and synchronized with a common timing reference, the overall history of a machine is maintained in the data storage array throughout its existence, even if its existence is transient. Thus, data forensics can be applied robustly, even to virtual machines, and even after the memory and disk space used to store the virtual machines have long been overwritten.

In accordance with one embodiment, a method for managing data in an electronic system for forensic analysis includes collecting a record of network activities occurring in the electronic system as the electronic system operates and collecting a record of storage activities occurring in the electronic system as the electronic system operates. The method further includes associating the record of network activities with the record of storage activities to obtain forensic information about events affecting both network activities and storage activities, including applying a common timing reference to the record of network activities and the record of storage activities to associate network activities and storage activities with one another in time.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. In the accompanying drawings.

DETAILED DESCRIPTION

An improved technique for performing forensic investigations in an electronic system includes capturing and associating a stream of network activities and a stream of storage activities. Records of the captured streams of activities are stored in a storage construct, such as a data storage array. A common timing reference is applied to the records of network activities and the records of storage activities to associate the records in time. A comprehensive history of the state of the machine is thus obtained, to enable examination and tracing of suspect and/or malicious occurrences across network and storage domains.

Particular embodiments will now be disclosed. It is understood that these embodiments are included by way of example only and are not intended as limiting the manner in which the improvements hereof may be practiced.

Figure 1:
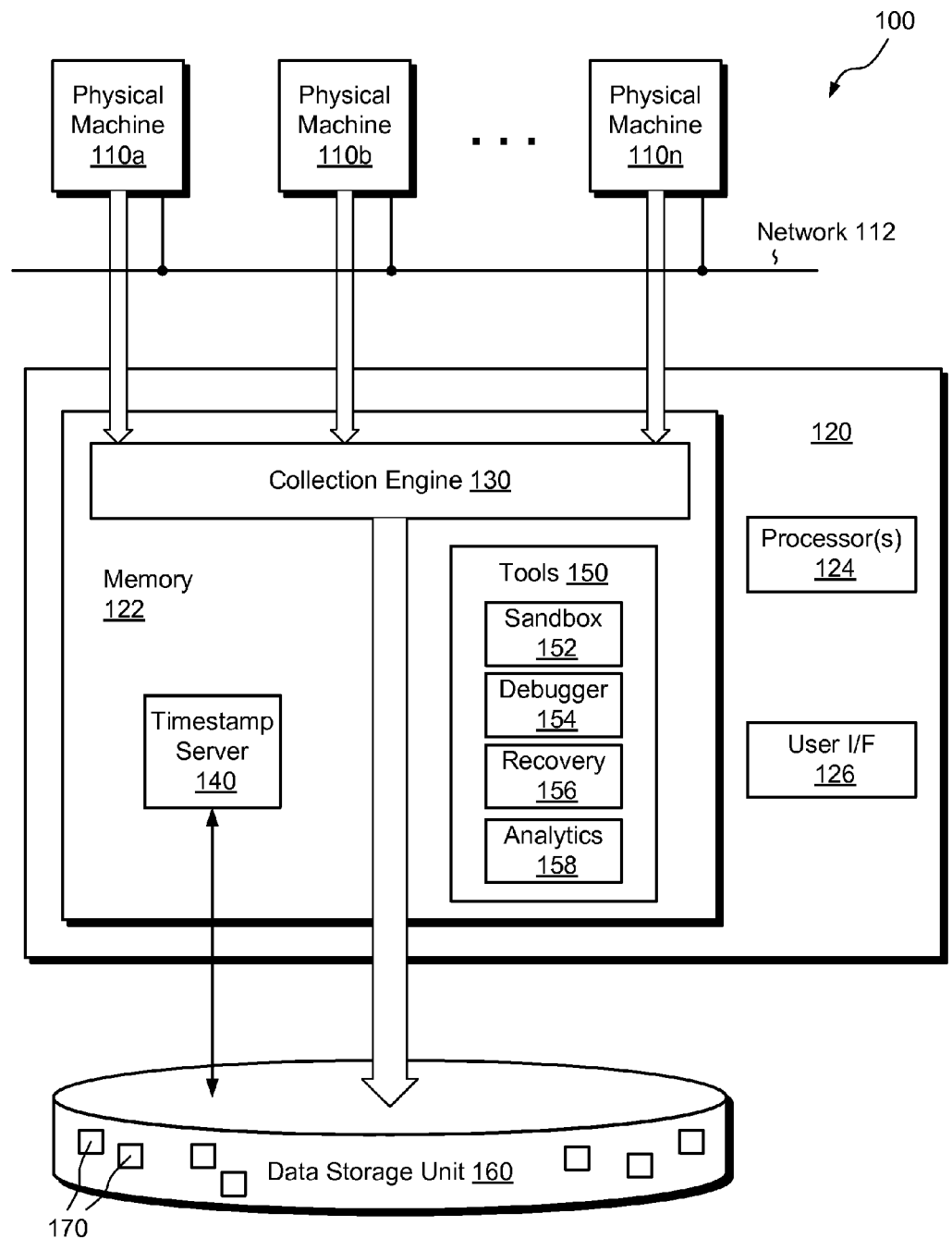
FIG. 1 is a block diagram of an example electronic system that stores, in a storage construct, records of network and storage activities of various physical computing machines.

FIG. 1 shows an example electronic system 100 in which network activities and storage activities are collected and associated for performing forensic analysis. The electronic system 100 is seen to include a number of physical machines, 110a-110n, a network 112, a computing system 120, and a data storage unit 160. The computing system 120 includes memory 122, a set of processors 124 (i.e., one or more processing chips and/or assemblies, and a user interface 126, such as a keyboard, pointer, and display. The memory 122 may include both volatile and non-volatile memory. The network 112 includes a physical network, such as a Local Area Network (LAN), a Wide Area Network (WAN), a virtual network, the Internet, some other network, or any combination of the foregoing, for example. The data storage unit 160 includes various data collections 170. The physical machines 110a-n are generally computers, such as server-grade computers, although they may be any type of computer or computing device. Any number of physical machines 110a-n may be provided. The physical machines 110a-n may each run an operating system. One or more of the physical machines 110a-n may be configured as a virtual machine platform for running virtual machines.

The memory 122 includes software constructs, such as a collection engine 130, a timestamp server 140, and tools 150, for example. The tools 150 may include a sandbox 152, a debugger 154, a recovery interface 156, and various analytic tools 158 for assisting with forensic investigations. It is understood that the set of processors 124 and memory 122 can be regarded as a specialized circuit for performing the various functions and methods described herein.

In operation, the physical machines 110a-n perform computing activities. For example, users may log onto the physical machines 110a-n, or the virtual machines they may contain, to run programs, use the Internet, read their email, and so forth. As they operate, the physical machines 110a-n perform network activities over the network 112 and storage activities with local memory and/or disk (not shown). Within the physical machines 110a-n, network and storage activities are monitored, and records of activities are created. The records of network and storage activities are gathered and sent to the collection engine 130. The collection engine 130 then writes the various records of activities to the data storage unit 160.

Records may be stored in the data storage unit 160 in any suitable way. In one example, each data collection 170 stores record entries for a single machine instance, where a "machine instance" is a virtual machine instance or a physical machine instance from among the physical machines 110a-n. Once a data collection 170 is created for a machine instance, it can be maintained indefinitely, even after the machine instance itself ceases to exist.

Record entries generally flow into the data collections 170 in three separate streams: network activities, memory activities, and disk activities. The collection engine 130 operates in coordination with the physical machines 110a-n to gather these activities for each machine instance running on the physical machines 110a-n and to store the activities in respective data collections 170 of the data storage unit 160. Typically, record entries of network activities, memory activities, and disk activities arrive independently and without synchronization with one another. To provide synchronization and allow accurate correlation among the network, memory, and disk streams, a common timing reference is applied. In one example, the timestamp server 140 inserts timestamps into records stored in the data collections 170, which allow network activities to be associated in time with contemporaneous memory and disk activities.

Once records of network, memory, and disk activities have been collected, a user or computer program may examine the records using the tools 150. For example, forensic experts may wish to open the sandbox 152 to examine a previous state of one or more machine instances that are believed to have been infected or otherwise subjected to malicious or suspect activity. The sandbox 152 provides a safe, contained environment for replaying malicious events without putting the computing system 120 or any of the physical machines 110a-n (or the virtual machines they may contain) at risk. Similarly, users may wish to invoke the debugger 154 to step forward or backward through different machine states, such as in an effort to trace the propagation of malicious activity or corruption through the network, memory, and/or disk activities of a machine instance. Users may invoke the recovery interface 156 to select machines or even servers at a particular point in time to recreate them for research. Analytics 158 may be applied as well, such as queries of the data collections 170, correlation analyses among records from different domains, and other statistical analyses.

In some implementations, the computing system 120 is a storage processor, such as may be obtained from EMC Corporation of Hopkinton, Mass. The storage processor may include a multipathing driver for providing high speed, parallel storage operations to the data storage unit 160. The data storage unit 160 may itself be implemented with a number of logical storage units (LUNs), which may include multiple physical units.

In some implementations, the constructs of the electronic system 100 may be distributed differently than as shown among different computing systems and hardware. For example, the timestamp server 140 and/or analysis engine 150 may be provided outside the computing system 120.

Also, it is envisaged that large scale installations may include hundreds or thousands of physical machines 110a-n housing an even greater number of virtual machines. In these instances, multiple computing machines 120 and data storage units 160 may be provided. Preferably, however, all such storage units 160 receive a common timing reference from a single timestamp server 140, to allow synchronization of activities across the entire installation.

Figure 2:
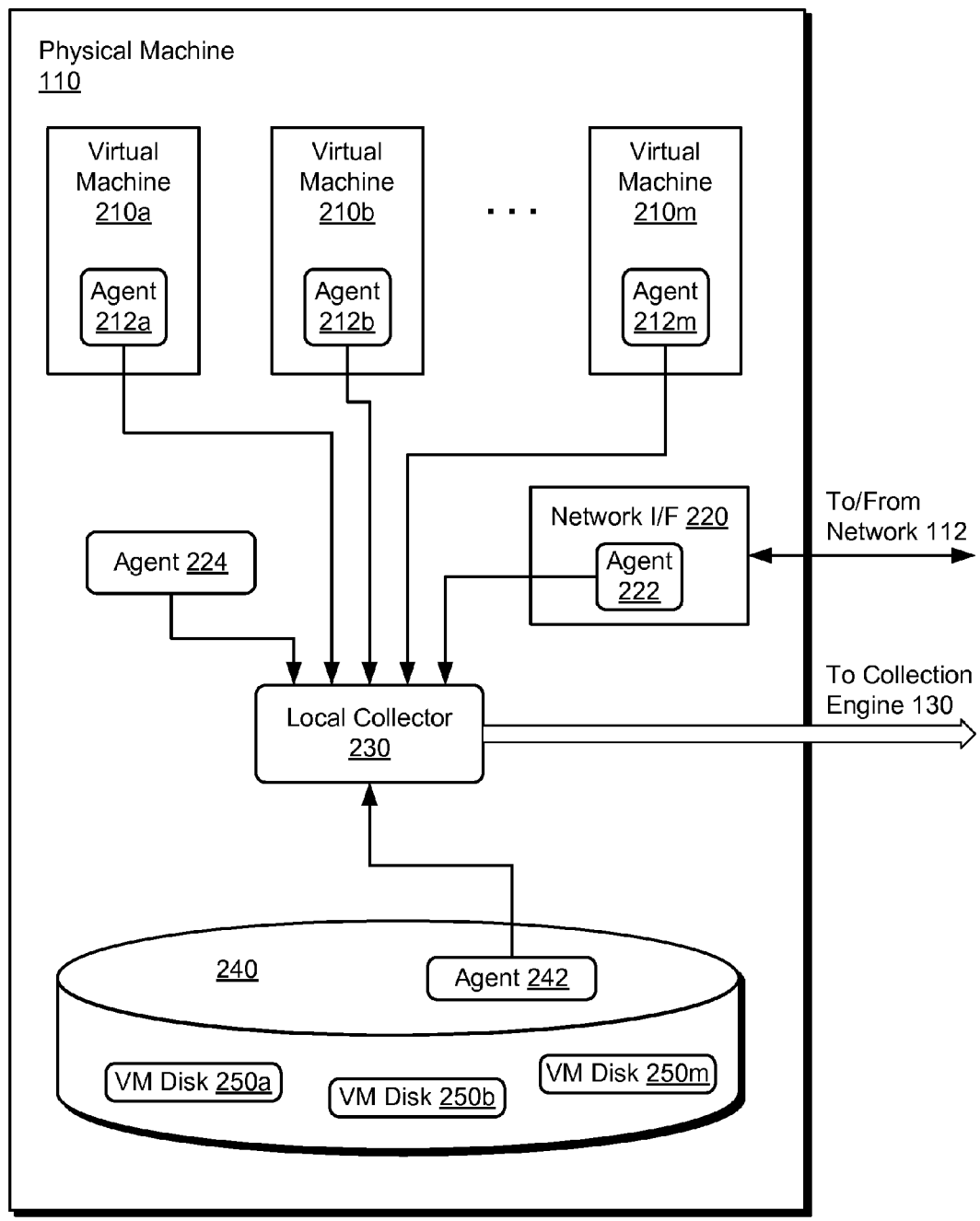
FIG. 2 is a block diagram of an example physical computing machine of FIG. 1.

FIG. 2 shows an example physical machine 110 of the physical machines 110a-n. Here, it is seen that the physical machine 110 is a virtual machine platform including virtual machines 210a-m, a network interface 220, a local collector 230, and a disk array 240. The disk array 240 may include virtual machine disks 250a-m, i.e., one for each virtual machine 212a-m. In one example, the physical machine 110 is a server running the ESXi hypervisor, which is available from VMWare® of Palo Alto, Calif.

The physical machine 110 may include a number of agents. For example, agents 212a-m may be provided, one for each virtual machine 210a-m. Also, an agent 222 may be provided for the network interface 220, an agent 242 may be provided for the disk array 240, and an agent 224 may be provided outside any of the virtual machines 210a-m. Agent 224 may be installed, for example, in the guest services area of the physical machine 110. A greater or lesser number of agents may be provided. For example, the agents 212a-m may be omitted where their activity would excessively burden the respective virtual machines 210a-m.

Each agent monitors the physical machine 110 for network, memory, and/or disk activities. In one example, the agent 222 may monitor only network activities, whereas the agent 242 may monitor only disk activities. Agent 224 may monitor only memory activities, or any combination of network, memory, and disk activities. It is desirable to have some level of redundancy among agents, such that multiple agents monitor the same activities from different vantage points. Redundant monitoring of activities helps to isolate malicious or suspect occurrences, such as when two agents monitoring the same activities report different results. Some agents may provide context-sensitive information (e.g., Data Loss Prevention (DLP) agents may be used), thus augmenting the forensic information acquired.

In addition to monitoring activities, the agents 212a-m, 222, 224, and 242 preferably also package the monitored activities into record entries. The record entries contain the activities in an encapsulated form, the details of which are not critical. Records entries may alternatively be packaged by the local collector 230. Typically, each record entry includes monitored activities for only one domain, i.e., network, memory, or disk. Also, each record entry typically pertains to only a single machine instance, such as the instance of any of the virtual machines 210a-m or the instance of the physical machine 110 as a whole.

Record entries from the various agents are sent to the local collector 230. The local collector 230 sends the record entries to the collection engine 130, which in turn sends them to the data storage unit 160 to be stored in data collections 170. In some examples, the local collector 230 may be omitted, and the agents 212a-m, 222, 224, and 242 may send record entries directly to the collection engine 130.

The agents 212a-m, 222, 224, and 242 may monitor network, memory, and disk activities according to any suitable schedule. In one example, activities are monitored, packaged, and sent to the collection engine 130 essentially in real time, as they occur. In other examples, network, memory, and disk activities are queued within the agents and reported at regular intervals. In still other examples, activities are queued and reported after a certain level of activity is reached, such as when a predetermined number of bytes are transferred, read, or written. In one particular example, network and disk activities are packaged and reported to the collection engine 130 as they occur, whereas memory activity is packaged and reported periodically, such as every hour. It has been observed that memory activities are frequent and involve a great deal of data. Therefore, reporting memory activities as they occur may be overly burdensome.

Figure 3:
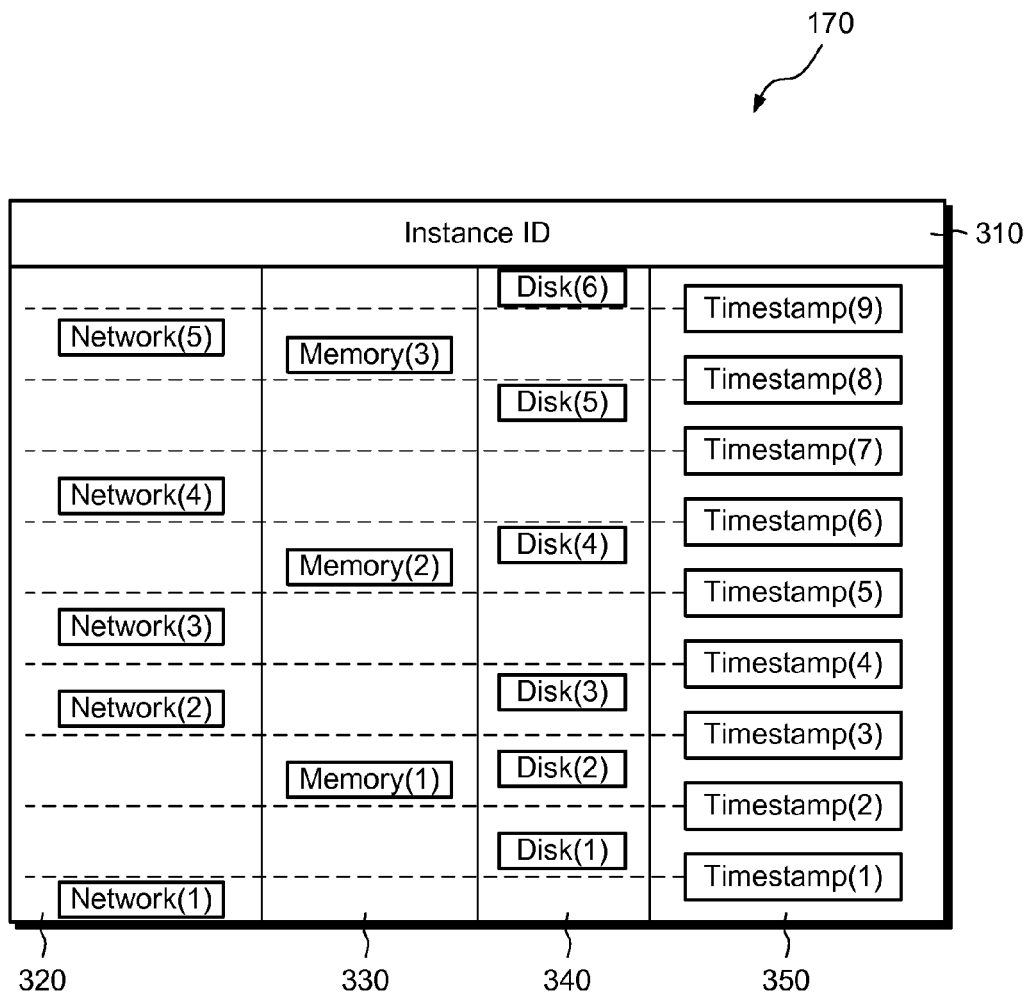
FIG. 3 is a chart showing an example arrangement of network activities, memory activities, disk activities, and timestamps in the storage construct of FIG. 1.

FIG. 3 shows an example arrangement of a data collection 170. As indicated, each data collection 170 stores a record 320 of network activities, a record 330 of memory activities, and a record 340 of disk activities for a particular machine instance. The record of network activities 320 includes individual network record entries (e.g., Network(1)-Network(5)). Similarly, the record of memory activities 330 includes individual memory record entries (e.g., Memory(1)-Memory(3)), and the record of disk activities 340 includes individual disk record entries (e.g., Disk(1)-Disk(6)). The machine instance is identified with an instance identifier (ID) 310. In some examples, the instance ID 310 identifies a virtual machine instance, such as one of the virtual machines 210a-m, or a physical machine instance.

Record entries for each machine instance are generally maintained in the data collection 170 in the order received, so that each record 320, 330, and 340 forms a sequence of record entries corresponding to a respective sequence of activities of the respective machine instance. In the example shown, timestamps 350 are applied at regular intervals relative to the records 320, 330, and 340. For instance, a new timestamp 350 may be applied every second, every minute, or at some other interval. The data collection 170 is constructed such that the timestamps 350 provide markers relative to each sequence of record entries 320, 330, and 340. It can therefore be ascertained where each record entry falls relative to adjacent time markers indicated by the timestamps.

The illustrated record entries in the records 320, 330, and 340 of FIG. 3 are not intended to be drawn to scale relative to one another or to the timestamps 350. For example, it may be typical for numerous network and/or disk record entries to fall between adjacent timestamps. Also, record entries for memory may occur less frequently than shown. It is therefore understood that FIG. 3 is merely illustrative of the general concepts involved.

Figure 4:
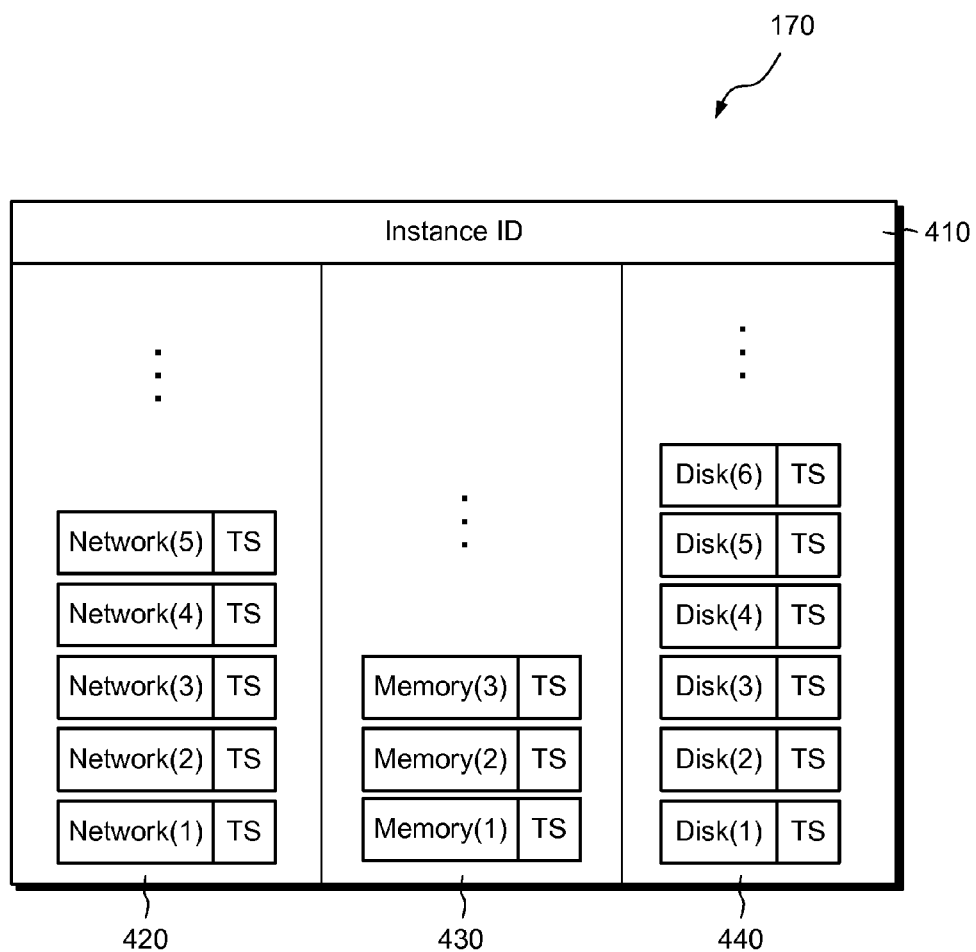
FIG. 4 is a chart showing an alternative example arrangement of network activities, memory activities, disk activities, and timestamps in the storage construct of FIG. 1.

FIG. 4 shows an alternative example arrangement of a data collection 170. Here, rather than applying timestamps to be used as markers relative to streams of record entries, a new timestamp (TS) is applied to each individual record entry as it is stored. The arrangement of FIG. 4 thus relieves the data collection 170 of having to store record entries in order, since timestamps can be used to order record entries after the fact. This approach requires the generation of many more timestamps, however.

Record entries may be stored in a myriad of other ways. FIGS. 3 and 4 are therefore merely illustrative. As yet a further example, record entries can be stored together for all machine instances and all domains of activities, with fields used to indicate the instance ID and the domain of activity.

Figure 5:
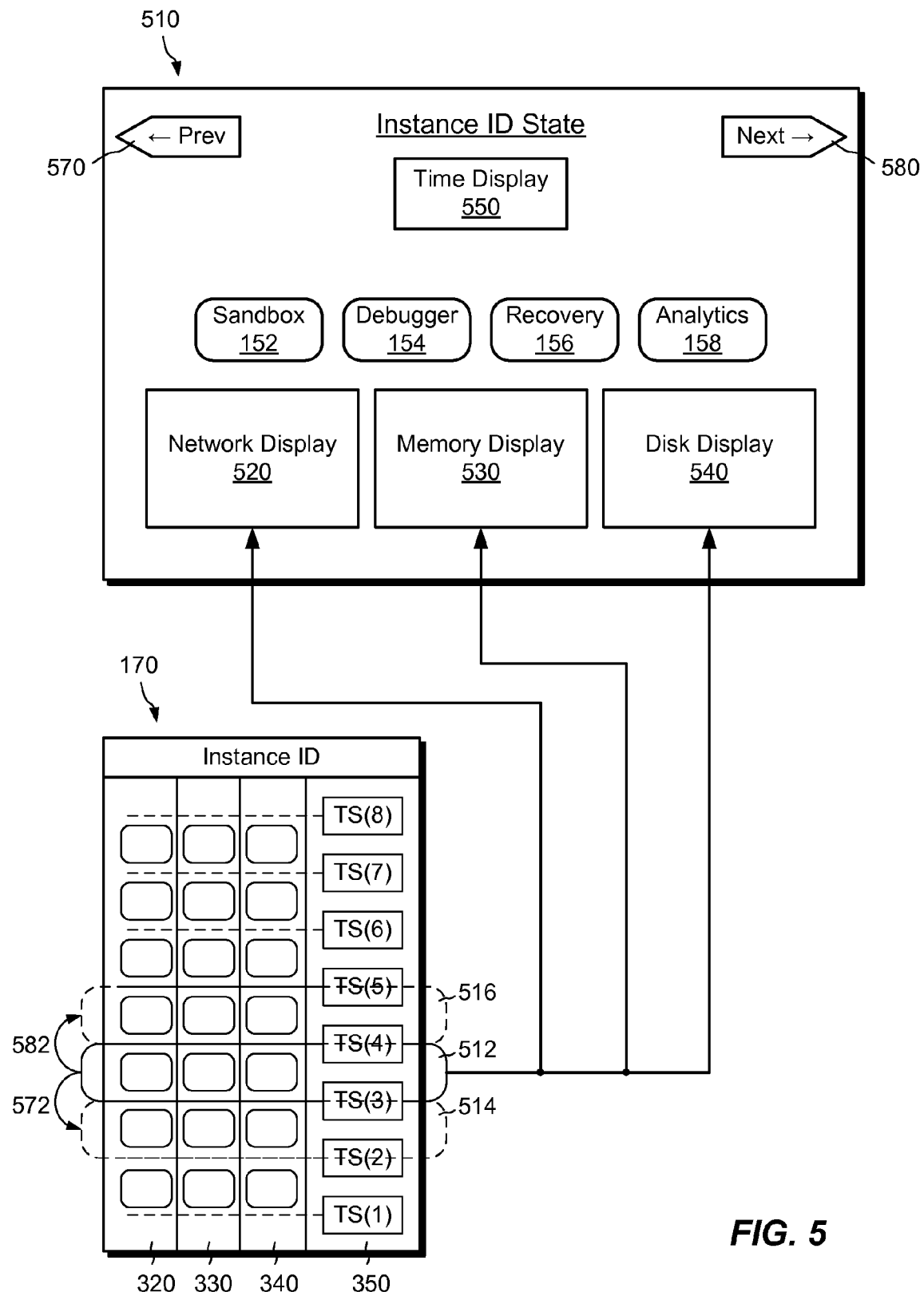
FIG. 5 is a block diagram showing an example user display of the electronic system of FIG. 1.

FIG. 5 shows and example display 510 of the electronic system 100, which may be viewed by a user of the computing system 120 via the user interface 126. The information presented in the display 510 is drawn from a data collection 170, such as one having the arrangement of FIG. 3.

In the example shown, the display 510 presents a network display region 520, a memory display region 530, and a disk display region 540. The contents for the display regions 520, 530, and 540 are respectively supplied by the record 320 of network activity, the record 330 of memory activity, and the record 340 of disk activity. Displayed content is restricted to a particular time interval, such as the time between two consecutive timestamps 350, as indicated by the time display 550.

Information shown in the display 510 relates to different groupings of data from the data collection 170 pertaining to different intervals of time. For example, groupings 512, 514, and 516 each identify respective information that can be depicted on the display 510 at any given time. The user can choose one of the groupings to show network, memory, and disk activities for the indicated instance ID over the respective time interval. For example, the user may choose selection 512, which corresponds to all record entries between timestamps TS(3) and TS(4). Using navigation buttons 570 and 580, the user may move backwards or forwards (designated by arrows 572 and 582) through the data collection 170, to display contents from earlier or later time intervals.

In this example, the user may also interact with the display 510 to run the tools 150. For example, the user may click the sandbox button 152 to open a sandbox for creating a safe environment in which to recreate a suspect machine instance without risking infection of other parts of the electronic system 100. The user may also click the debugger button 154 to open an interface for stepping through and replaying different states of a machine instance while tracking detailed aspects of machine activities. The user may further click a recovery button 156, to invoke a recovery interface to recreate machine instances or even servers, such as for research purposes. Also, the user may click an analytics button 158, for running tools for detecting anomalies in the machine instances, tracing and correlating network, memory, and disk activities, querying the various data collections 170, and calculating statistics. It is understood that the display 510 is merely illustrative of one portion of a user interface that the electronic system 100 may employ and should not be regarded as limiting in any way.

Figure 6:
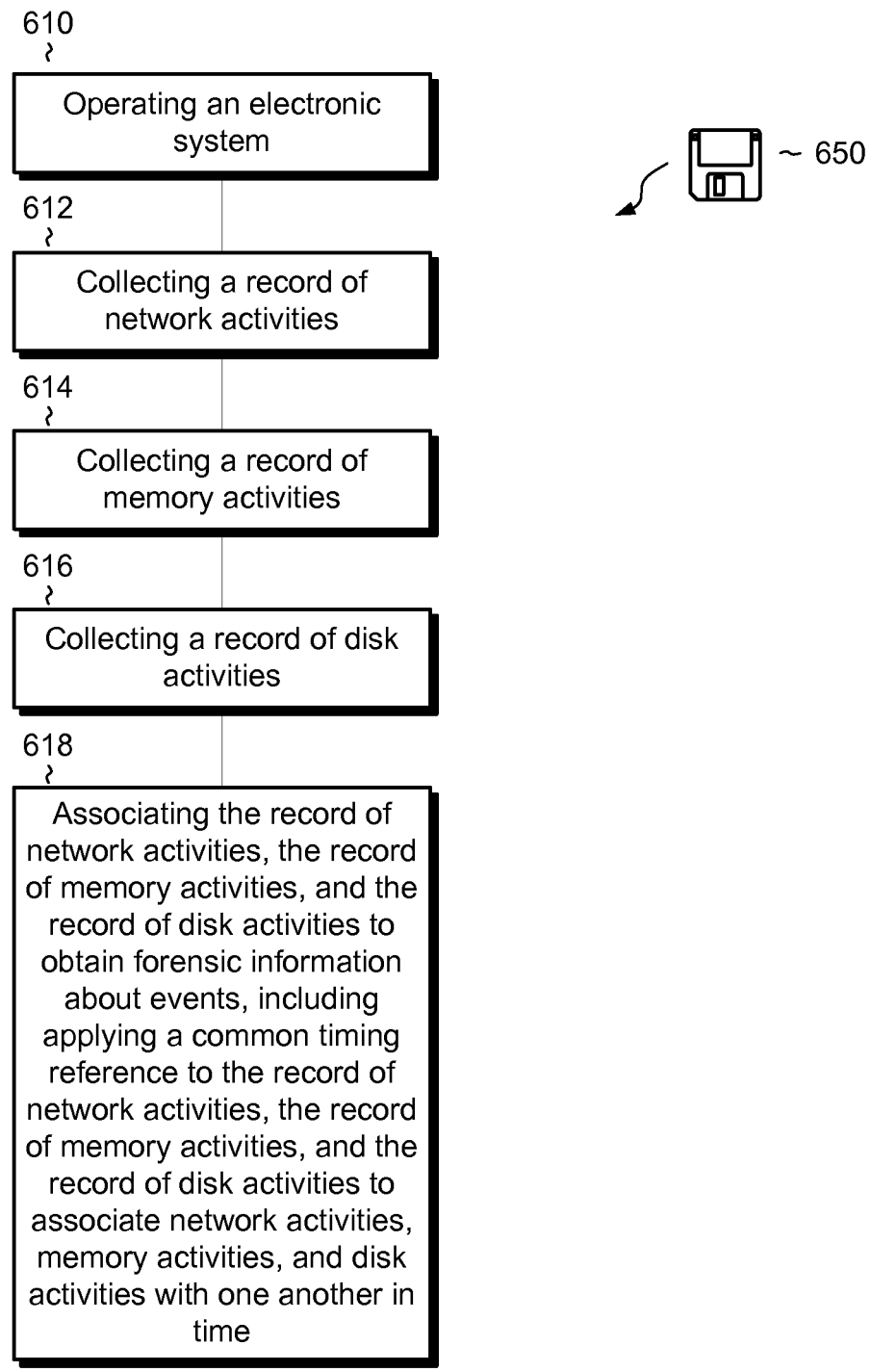
FIG. 6 is a flowchart showing an example process for managing data in the electronic system of FIG. 1.

FIG. 6 shows a process that may be carried out in connection with the computing environment 100. This process is performed, for example, by the software constructs described in connection with FIG. 1, which reside in the memory 122 of the computing system 120 and are run by the set of processors 124. The various acts of this process may be ordered in any suitable way. Accordingly, embodiments may be constructed in which acts are performed in orders different from those illustrated, which may include performing some acts simultaneously, even though the acts are shown as sequential in the illustrated embodiments.

At step 610, the electronic system 100 is operated. For example, various virtual machines instances 210a-m may be run on behalf of users.

While the electronic system 100 is operating, a record of network activities is collected (step 612), a record of memory activities is collected (step 614), and a record of disk activities is collected (step 616). These records are stored in data collections 170 in the data storage unit 160.

At step 618, the record of network activities, the record of memory activities, and the record of disk activities are associated to obtain forensic information about events. Associating the different records includes applying a common timing reference to the record of network activities, the record of memory activities, and the record of disk activities to associate the network activities, memory activities, and disk activities with one another in time.

A comprehensive history of the electronic system is thus obtained, with network, memory, and disk activities coordinated in time, to enable examination and tracing of suspect or malicious occurrences both within and across the different domains. Activities from network, memory, and disk can be synthesized to identify suspect activities that might otherwise go undetected if only a single domain were inspected. Also, since all network, memory, and disk activities are stored and synchronized with a common timing reference, the overall history of a machine is maintained throughout its existence, even if its existence is transient. Thus, data forensics can be applied robustly, even to virtual machines, and even after the memory and disk space used to store the virtual machines have long been overwritten.

As used throughout this document, the words "comprising," "including," and "having" are intended to set forth certain items, steps, elements, or aspects of something in an open-ended fashion. Although certain embodiments are disclosed herein, it is understood that these are provided by way of example only and the invention is not limited to these particular embodiments.

Having described certain embodiments, numerous alternative embodiments or variations can be made. For example, although it is shown and described that records are collected of network activities, memory activities, and disk activities, there is merely an example. Alternatively, records may be collected only of network and memory activities, or only of network and disk activities. Additionally, information about additional activities may be collected.

Also, it has been described that all record entries are stored in the data storage unit 160. However, filters may be applied to limit the volume of data stored or to focus the data on suspect areas.

Also, it has been described that records of activities are continually added to the data storage unit 160, which stores the records indefinitely. Alternatively, older records may be summarized, compressed, and/or consolidated to leave more room for new records, and/or the data storage unit 160 may be allowed to overflow, so that records older than a certain age will be overwritten with new data. Records maintained in the data storage unit 160 may thus be valid only for a limited time.

Also, although the improvements herein have been described in particular relation to virtual machines, it is understood that the improvements presented are not limited to virtual machines. The same principles may be applied to physical machines, including physical machines that are not used for housing virtual machines.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 650 in FIG. 6). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Those skilled in the art will therefore understand that various changes in form and detail may be made to the embodiments disclosed herein without departing from the scope of the invention.

What is claimed is:

1. A method for managing data in an electronic system for forensic analysis, comprising:
   operating the electronic system;
   collecting a record of network activities occurring in the electronic system as the electronic system operates;
   collecting a record of storage activities occurring in the electronic system as the electronic system operates;
   associating the record of network activities with the record of storage activities to obtain forensic information about events affecting both network activities and storage activities, including applying a common timing reference to the record of network activities and the record of storage activities to associate network activities and storage activities with one another in time; and
   aligning in time the record of network activities and the record of storage activities by identifying multiple record entries for each of network activities and of storage activities corresponding to substantially the same points in time.

2. The method as recited in claim 1, wherein the electronic system includes memory and a set of disks, and wherein collecting the record of storage activities includes:
   collecting a record of memory activities of the memory of the electronic system; and
   collecting a record of disk activities of the set of disks of the electronic system.

3. The method as recited in claim 2,
   wherein collecting the record of network activities includes collecting different record entries of network activities as the network activities occur,
   wherein collecting the record of memory activities includes collecting different record entries of memory activities on a periodic basis, and
   wherein collecting the record of disk activities includes collecting different record entries of disk activities as the disk activities occur.

4. The method as recited in claim 3, further comprising:
   storing the different record entries of network activities, memory activities, and disk activities in a storage construct of the electronic system,
   wherein applying a common timing reference includes storing a series of timestamps in the storage construct in connection with the record of network activities, the record of memory activities, and the record of disk activities.

5. The method as recited in claim 4, further comprising generating the series of timestamps with a timestamp server of the electronic system, wherein storing the series of timestamps includes storing a timestamp in the storage construct for each record entry of network activities, memory activities, and disk activities.

6. The method as recited in claim 2, wherein the electronic system includes a virtual machine platform including a physical machine having a set of virtual machines.

7. The method as recited in claim 6, further comprising:
   monitoring at least one of network activities, memory activities, or disk activities of the virtual machine platform; and
   storing the monitored activities in a storage construct of the electronic system with associated timestamps.

8. The method as recited in claim 7, wherein the monitoring is performed within each of the set of virtual machines.

9. The method as recited in claim 7, wherein the monitoring is performed within the virtual machine platform externally to any virtual machine.

10. The method as recited in claim 7, wherein each virtual machine has an identifier and wherein storing the monitored activities in the storage construct includes organizing the stored activities in connection with the virtual machine identifier to enable identification and retrieval of network activities, memory activities, and disk activities of each individual virtual machine of the virtual machine platform.

11. The method as recited in claim 4, further comprising aligning in time the record of network activities, the record of memory activities, and the record of disk activities by identifying multiple record entries for each of network activities, memory activities, and of disk activities corresponding to substantially the same points in time as indicated by the series of timestamps.

12. The method as recited in claim 11, further comprising rendering for forensic investigation information relative to the electronic system at one point in time as indicated by the series of timestamps, the information pertaining to the record of network activities, the record of memory activities, and the record of disk activities at the one point in time.

13. The method as recited in claim 12, further comprising rendering for forensic investigation information relative to the electronic system at other points in time as indicated by the series of timestamps, the information pertaining to the record of network activities, the record of memory activities, and the record of disk activities at each other point in time.

14. The method as recited in claim 13, further comprising identifying differences between information relative to the electronic system rendered at different points in time to trace computing activities through the electronic system.

15. The method as recited in claim 4, further comprising:
   creating a sandbox defining a space within the electronic system; and
   replaying a series of machine states of the electronic system, the series of machine states being derived from the record of network activities, the record of memory activities, and the record of disk activities.

16. The method as recited in claim 15, wherein replaying a series of machine states of the electronic system includes stepping forward from one machine state to a later machine state and stepping backward from one machine state to an earlier machine state.

17. An electronic system, comprising:
   a set of processors; and
   memory, coupled to the set of processors, the memory constructed and arranged to store instructions executable by the set of processors,
   wherein the set of processors executing instructions from the memory forms a specialized circuit constructed and arranged to:
      collect a record of network activities occurring in the electronic system as the electronic system operates;
      collect a record of storage activities occurring in the electronic system as the electronic system operates;
      associate the record of network activities with the record of storage activities to obtain forensic information about events affecting both network activities and storage activities, including to apply a common timing reference to the record of network activities and the record of storage activities to associate network activities and storage activities with one another in time; and
      align in time the record of network activities and the record of storage activities by identifying multiple record entries for each of network activities and of storage activities corresponding to substantially the same points in time.

18. The electronic system as recited in claim 17, further comprising a data storage unit that stores the record of network activities and the record of storage activities.

19. The electronic system as recited in claim 17, wherein the set of processors is further constructed and arranged to:
   create a sandbox defining a space within the electronic system; and
   replay a series of machine states of the electronic system, the series of machine states being derived from the record of network activities and the record of storage activities.

20. A non-transitory computer readable medium including instructions which, when executed by a set of processors, cause the set of processors to perform a method for managing data in an electronic system for forensic analysis, the method comprising:
   collecting a record of network activities occurring in the electronic system as the electronic system operates;
   collecting a record of storage activities occurring in the electronic system as the electronic system operates;
   associating the record of network activities with the record of storage activities to obtain forensic information about events affecting both network activities and storage activities, including applying a common timing reference to the record of network activities and the record of storage activities to associate network activities and storage activities with one another in time; and
   aligning in time the record of network activities and the record of storage activities by identifying multiple record entries for each of network activities and of storage activities corresponding to substantially the same points in time.

21. The method of claim 1, further comprising:
storing within a data storage system, multiple data collections, each of the multiple data collections pertaining to a respective virtual machine instance that previously ran in the electronic system, each of the multiple data collections including a record of network activities collected for the respective virtual machine instance, a record of storage activities for the respective virtual machine instance, and a series of timestamps providing a common timing reference for the record of network activities and the record of storage activities stored in the respective data collection,
wherein the series of timestamps for all of the multiple data collections are supplied by a single timestamp server, to allow synchronization of activities across different virtual machine instances.

22. The method of claim 21,
wherein, for each of the multiple data collections, the record of network activities and the record of storage activities are collected in the order in which they are received, and
wherein, for each of the multiple data collections, the series of timestamps are recorded on a regular basis.

* * * * *